United States Patent

Nelson

[15] 3,672,499

[45] June 27, 1972

[54] MULTIPLE USE SORTING CARD

[72] Inventor: Lorne W. Nelson, 10118 Dupont Ave. S., Minneapolis, Minn. 55431

[22] Filed: Dec. 17, 1970

[21] Appl. No.: 99,082

[52] U.S. Cl. ....................................209/80.5, 235/61.12 R

[51] Int. Cl. ....................................................B07c 5/06

[58] Field of Search................209/80.5, 110.5; 235/61.12 R, 235/61.12 C, 61.12 N, 61.12 M

[56] References Cited

UNITED STATES PATENTS 2,251,728 8/1941 Artana...............................235/61.12

3,418,119 12/1968 Schwartz et al....................235/61.12

*Primary Examiner*—Allen N. Knowles

*Attorney*—Merchant & Gould

[57] ABSTRACT

A multiple use information card for use with a plurality of other such cards in needle probe sorting. The card consists of a primary body portion having a peripheral edge in which information is encoded by punching, and a plurality of detachable row strips each of which represents a separate information field. The row strip disposed at the card periphery is punched with certain information, usually of a non permanent nature, which permits its use as a data storing device in the sorting process. When the non permanent information has no further use the row strip is severed from the card, thus presenting a new peripheral edge and information field.

7 Claims, 1 Drawing Figure

PATENTED JUN 27 1972 3,672,499
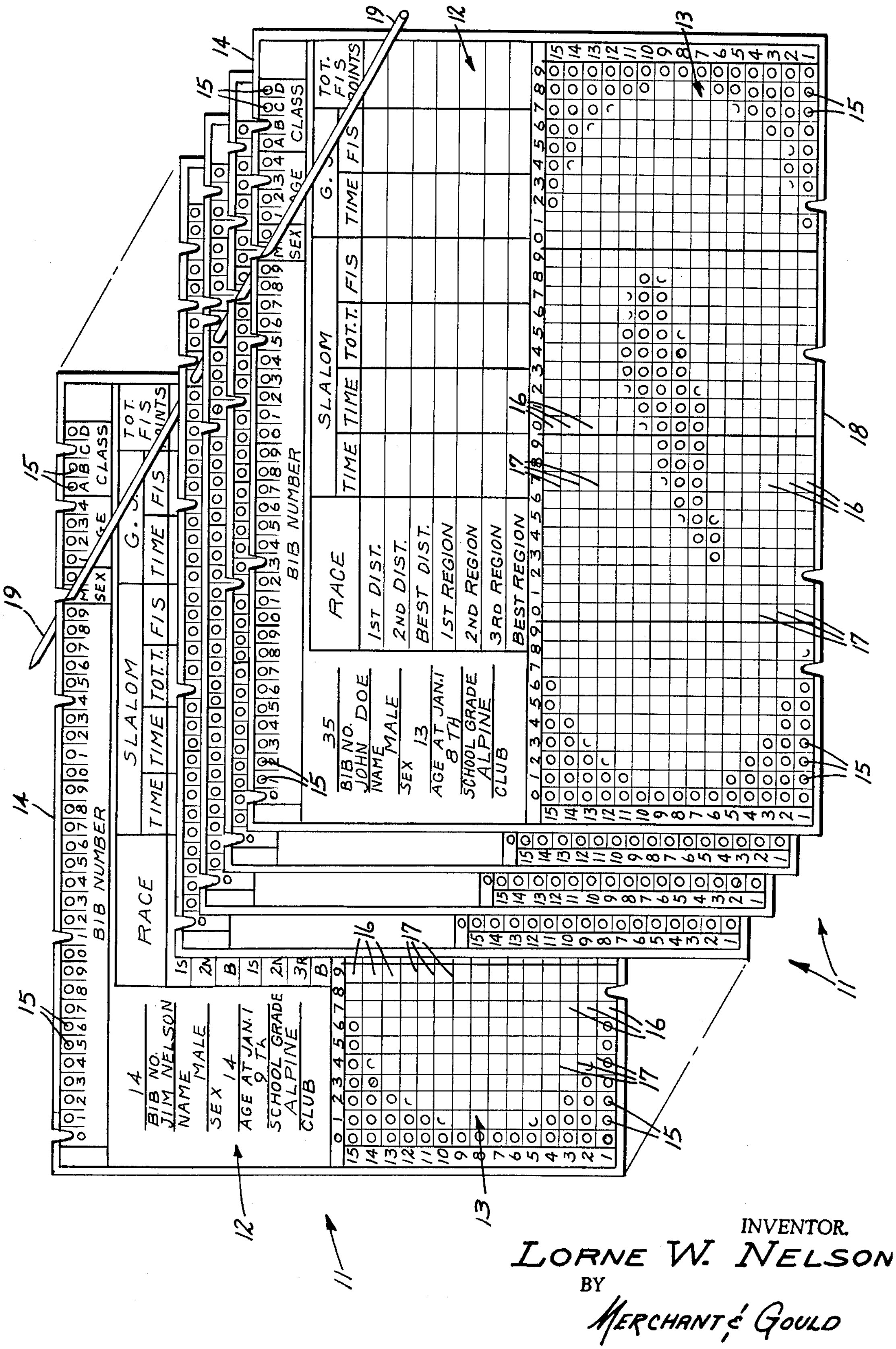
INVENTOR.
LORNE W. NELSON
BY
MERCHANT & GOULD
ATTORNEYS

MULTIPLE USE SORTING CARD

The invention is directed generally to punched information cards used in needle probe sorting processes, and specifically contemplates a single card which can be encoded with new information a plurality of times.

Needle probe sorting is a well known process having particular application in handling and arranging data in relatively small quantities. Conventionally, the practice consists of encoding the peripheral edge of an information field and arranging a plurality of such cards into a stack with the information fields aligned. A needle probe is then inserted through a desired portion of the information field, and lifting of the probe causes slotted cards to fall from the group while retaining whole punched cards. Sorting of the cards with respect to specific information desired is thus effected.

Although the process is ordinarily carried out manually, it is nonetheless a significant time saver in processing small batches of information.

One drawback of the needle probe sorting process, which I have sought to improve with my invention, arises from the inability of an individual information card to represent more than one group of unique information. This is, of course, a direct result of the inherent necessity of placing the punched information at the peripheral edge of a card. Such placement must be done to permit the formation of probe releasing slots, but limits the size of the information field in accordance with periphery of the card. Thus, when the peripheral information field has been filled, no further information can be included, and usage of the card is limited to that set of unique information.

I have devised an information card which is not so limited. The preferred embodiment of the card includes a primary body portion having a peripheral edge along which information of a generally permanent nature is punched. A secondary body portion is broken down into a plurality of parallel row strips, each of which is severable from the card and is capable of forming a peripheral edge along which information of a non permanent or changing nature is punched. After this latter information has been used to effect proper classification of the card in the sorting procedure, the peripheral row strip of information is severed from the card and a new peripheral edge and information field are exposed.

As will be shown in further detail below, the preferred embodiment finds particular application in the rating of contestants in ski events over an entire season of skiing. The information of a more permanent nature (i.e., lasting through the ski season) includes the contestant's name, age, sex, school grade, etc. The changing information punched into the severable row strips comprises the elapsed time taken by an individual contestant to complete a particular race. Upon completion of the race, the information cards of all contestants are merged into a stack with information fields aligned, and the needle probe sorting process quickly and efficiently determines the order in which the contestant finished. Once this has been established, that row strip is severed from the card, and information from the next race can then be entered. Thus, the inventive card provides the advantage of permanent information storage while allowing information of a non permanent nature to be changed when necessary.

BRIEF DESCRIPTION OF THE DRAWING

The single drawing is a perspective view of a plurality of cards embodying the inventive principal, showing with particularity the stacked and aligned relationship which permits sorting through use of a needle probe.

DESCRIPTION OF THE PREFERRED EMBODIMENT

The single figure shows a plurality of information cards 11, each of which consists of a primary body portion 12 and a secondary portion 13. As is shown, the primary body portion includes a plurality of spaces or boxes which are manually filled in with information relating to an individual contestant partaking in a season of ski racing. A number of these boxes provide information that is permanent in nature, or is valid at least for the length of the skiing season. Typical of such information are the skier's name, age, sex, school grade, and the bib number worn during competition. The remaining boxes include statistical information relating to the contestant's time and point accumulation for specific races. These information boxes are broken down by the type of race (i.e. slalom and giant slalom), each such classification including subclassification for elapsed time to complete a race or races, combined time and the point awarded pursuant to rules of the International Ski Federation. The total award points are combined in the last vertical column.

Primary body portion 12 has an upper peripheral edge 14 which defines a prepared information field broken down into information groups corresponding to a portion of the permanent information mentioned above. As is shown, the first group of the information field represents the number and comprises three sets of digits, each set including the digits 0–9 inclusive. Each digit of each set is inturn represented by a punched hole 15 of predetermined diameter. All of the holes 15 are disposed at a uniform distance from peripheral edge 14 to permit proper alignment with corresponding punched holes in other information cards 11. The groups are encoded with specific information by providing a V-slot between the appropriate punched hole 15 and the extreme edge of the card. For example, it can be seen in the information boxes of the top card 11 that Joe Doe has a bib number 45. Consequently, the V-slot is punched in the "0" of the first set of digits, the "3" of the second set of digits and the "5" of the third set. Similar information groupings are included for sex, age and class, and appropriate information permanent in nature is punched accordingly. Thus, it can be seen that the top peripheral edge 14 of each of the cards 11 is encoded to represent information which remains valid throughout the period of card usefulness.

The secondary body portion 13 comprises a plurality of horizontal row strips 16 numbered 1–15 on the card. Row strips 16 are uniformly arranged on card 11 and are divided by severance lines 17 which provide a cutting guide as described in further detail below.

Each of the row strips 16 is broken down into four sets of digits numbered 0–9 which are used to represent the elapsed time of the contestant in a specific race. Since the times are ordinarily accurate to hundredths of a second, it follows that the groups of digits will represent any elapsed time of 0.00 seconds to 99.99 seconds.

As with the groups of permanent information, each digit of each row strip 16 is prepared or prepunched with a small circular hole 15. The row strip 16 defining the lower peripheral edge 18 of each card 11 is the only row 16 encoded with statistical information. In this case, the row strip 16 numbered "1" on the card defines the lower peripheral edge 18 of card 11, and is punched with V-slots. However, it is evident that detaching or severing this bottommost row strip 16 from card 11 will expose a new row strip 16 and information field which can be appropriately encoded to represent the results of another race. The respective V-punchings in the information sets of row number "1" represent 7, 2, 4 and 2, meaning that the contestant Joe Doe completed the most recent race in 72.42 seconds.

The use of information cards 11 begins with written entry of the contestants name, age, bib number, etc. in the information boxes. This information is encoded in the information field extending along the peripheral edge 14, thus providing permanent identification of the contestant throughout the skiing season. Upon completion of each race the contestant enters, his elapsed time is entered manually in the appropriate information box and then transferred to the bottommost row strip 16 by punching the appropriate digit in each set of digits. Coded entries are also made when the contestant did not start, did not finish or was disqualified from the race for some reason. The numerical codings given in such instances are of either extremely high or low magnitude to preclude the possibility of a contestant's elapsed time coinciding with the disqualification encoding. For example, "did not start", "did not finish" and "disqualified" could be respectively represented in the appropriate row strips 16 by 00.00, 11.01, and 00.02.

Upon completion of each race, and after appropriate punching of the bottom row strips 16 of each contestant's card, the cards are stacked so that the information fields disposed along both peripheral edges 14 and 18 are in alignment. Sorting is effected by a needle probe 19, which may be used either singly or in combination with other probes for faster sorting. Initially, the cards are sorted on the basis of sex to break down the overall group into appropriate competing classes. As shown in the figure, this is accomplished by inserting probe 19 through either the male or female information hole, thus allowing the slotted cards to drop while retaining the unslotted cards. Next, the cards 11 of those contestants who did not start, did not finish or were disqualified are removed from the respective stacks and the proper "FIS" points entered in the information box for that race.

Using a single needle probe 19, the remaining cards are first sorted into groups based on 10 second intervals by sequential insertion of the probe into each digit opening in the first group of information in row strip 16 (reading from left to right). Further sorting is effected on the basis of single second intervals by sequential insertion of probe 19 into the digit holes of the second group of row strips 16. Further sorting may be accomplished by sequential insertion of probe 19 into the third and fourth groups on row strip 16; or, if the number of cards in each sorted stack is low in number, visual sorting may prove to be faster.

Based on the contestant's finishing positioning in time, his "FIS" points are calculated and entered in the proper information box. At this point, the punched information in the information field along peripheral edge 18 is of no further use, and the row strip 16 containing that information may be severed from card 11. A new row strip 16 and information field are then ready for information from the next race. Similar entry of information and sorting is carried out for each race throughout the skiing season.

Under ordinary circumstances, the cards 11 for all of the contestants will have the same number of row strips 16 remaining upon completion of each race. However, in the event that wrong information is punched into a row strip 16, that row strip may be detached and correct information punched into the next row. This causes the correct card to be shorter, but alignment of information fields is not precluded since, in the upright position, the lower peripheral edge 18 of each card 11 remains as its reference point. However, should it be necessary to undertake further sorting with respect to the permanent information encoded along upper peripheral edge 14, it is necessary to turn cards 11 upside down to reestablish a proper reference point and effect alignment of the upper information field.

What is claimed is:

1. A multiple use information card for use with a plurality of other such cards in a needle probe sorting process, comprising:

a primary card body portion having a peripheral edge defining an information field along which information may be encoded;

a secondary card body portion comprising a plurality of row strips each of which is detachable from the information card, each row strip capable of defining a peripheral edge for the information card which defines an information field along which information may be encoded;

each of the several information fields comprising a plurality of encoding spaces to represent desired information, each of said spaces having an aperture formed therein, said apertures being uniformly arranged with respect to the appropriate peripheral edge to permit alignment of information fields of all such cards.

2. The card as defined by claim 1, wherein the primary card body portion further comprises a plurality of defined information spaces disposed apart from the information field.

3. The card as defined by claim 1, wherein the information card is generally rectangular in shape, and the several information fields are disposed longitudinally of the card and essentially parallel to each other.

4. The card as defined by claim 1, wherein said desired information is encoded in the peripheral edge information field by forming slots in selected information spaces each of said slots extending from the appropriate aperture to said peripheral edge.

5. A sorting process employing a plurality of information cards each of which includes a plurality of row strips defining information fields, one row strip forming a peripheral edge of the card and each being detachable from the card to form a peripheral edge therefor, the process comprising the steps of:

encoding information in each card in the row strip forming the peripheral edge of the card;

merging the cards into a card stack with the encoded peripheral edges aligned;

sorting the cards by comparison of the aligned coded information;

and severing the encoded row strips from the respective information cards to expose a new peripheral edge and information field.

6. The sorting process as defined by claim 5, wherein:

the information field of each row strip comprises a plurality of apertures arranged in a row and uniformly disposed from said peripheral edge;

the encoding comprises forming open slots between the peripheral edge and selected apertures to represent unique information;

and sorting is effected by inserting a needle probe through aligned apertures in the stack of cards and causing those cards in which the aperture is slotted to be removed from the stack.

7. A multiple use information card for use with a plurality of other such cards in a needle probe sorting process, comprising:

a. a primary card body portion;

b. a secondary card body portion comprising a plurality of row strips each of which is detachable from the information card, each row strip capable of defining a peripheral edge for the information card which defines an information field along which information may be encoded;

c. each of the several information fields comprising a plurality of encoding spaces to represent desired information, each of said spaces having an aperture formed therein, said apertures being uniformly arranged with respect to the appropriate peripheral edge to permit alignment of information fields of all such cards.

* * * * *